United States Patent [19]

Wampfler

[11] 3,880,920

[45] Apr. 29, 1975

[54] RECOVERY OF METAL AND BROMINE CATALYSTS COMPONENTS FROM RESIDUE OF AROMATIC ACID PRODUCED BY AND RECOVERED FROM CATALYTIC LIQUID PHASE OXIDATION

[75] Inventor: Gene L. Wampfler, Lombard, Ill.

[73] Assignee: Standard Oil Company, Chicago, Ill.

[22] Filed: Oct. 20, 1972

[21] Appl. No.: 299,410

[52] U.S. Cl.............. 260/524 R; 423/140; 423/499; 252/413
[51] Int. Cl.............................................. C07c 63/02
[58] Field of Search...... 423/499, 50, 144; 252/413; 260/524 R

[56] References Cited
UNITED STATES PATENTS

| | | | |
|---|---|---|---|
| 1,437,740 | 12/1922 | Weidel................................ | 423/499 |
| 2,865,708 | 12/1958 | Dinsmore........................... | 423/50 X |
| 3,341,470 | 9/1967 | Hensley, Jr. ........................ | 252/413 |
| 3,557,173 | 1/1971 | Trevillyan ........................ | 260/524 R |
| 3,673,154 | 6/1972 | Trevillyan ........................ | 260/524 R |

*Primary Examiner*—Oscar R. Vertiz
*Assistant Examiner*—Brian E. Hearn
*Attorney, Agent, or Firm*—Fred R. Ahlers; Arthur G. Gilkes; William T. McClain

[57] ABSTRACT

Recovery of aromatic acid produced by catalytic liquid phase oxidation of nuclear alkyl-substituted aromatic hydrocarbons in the presence of cobalt and/or manganese and bromine components of catalysis provides residue containing said catalyst components contaminated with organic materials and corrosion metals. Selective recovery from said residue of catalyst metals as their acetates and bromine as lithium bromide both substantially free of contaminant corrosion metals can be achieved by treating such residue with water and lithium carbonate to provide catalyst metal carbonate-containing precipitate which is heated with acetic acid to obtain a solution of catalyst metal acetates, incinerating solutes dissolved in water, and if desired undissolved organics from said residue, to obtain an ash containing lithium bromide and lithium carbonate, leaching said ash with water to extract lithium bromide, and using the lithium carbonate content of the ash for the first residue treatment step.

3 Claims, No Drawings

RECOVERY OF METAL AND BROMINE CATALYSTS COMPONENTS FROM RESIDUE OF AROMATIC ACID PRODUCED BY AND RECOVERED FROM CATALYTIC LIQUID PHASE OXIDATION

BACKGROUND OF INVENTION

Cobalt or manganese or a combination of cobalt and manganese employed as their acetates together with a source of bromide ion provide catalysis for the catalytic liquid phase oxidative methods for preparation of aromatic carboxylic acids in the presence of acetic acid as solvent according to the methods of U.S. Pat. No. 2,833,816 and No. 3,139,452 and modifications thereof. After separation of the aromatic acid product and recovery of acetic acid from the oxidation effluent, a residue is obtained which contains, in addition to the metal and bromine catalyst components, organic acidic and neutral (e.g. aldehyde and ester) materials which are co- and by-products and metals of corrosion from the oxidation apparatus in which the oxidation was conducted or in which hot acetic acid solvent came in contact before, during and following the oxidation. Such metals as Fe, Cr and Cu can be present in such residue either from corrosion of process apparatus or from the original source of fresh Mn and/or Co acetates used as catalysts. Accumulation of Fe, Cr and Cu with recycled Mn and/or Co catalysts can seriously reduce yield and/or production rate of the aromatic acid. As long as the recycled catalyst contains no more than 0.06 gram copper, 0.8 gram iron, 5 gram nickel and 5 grams chromium per 1000 grams manganese or per 500 grams of cobalt, recycle of such catalyst metals will not provide accumulation of those metals to concentrations seriously diminishing aromatic acid yields.

Some of the organic co- and by-products remaining in the acetic acid mother liquor portion of the reaction effluent after separation of the desired aromatic acid product are undesirable as contaminants in such aromatic acid product. Recycle to oxidation of such acetic acid mother liquor can be practiced as a means for efficient use of catalyst metal. But such practice can ultimately cause accumulation in the reaction system of said yield and rate-reducing metals and organic contaminants. In most cases, all or a part of such acetic acid mother liquor is subjected to distillation to recover acetic acid for its recycle as solvent to the oxidation reaction. From such recovery of acetic acid there remains a residue containing catalyst and contaminant metals and organic acidic and neutral materials. Such a residue has a high melting point and, as a liquid, is rather viscous.

Some aromatic acids produced by such catalytic liquid phase oxidations are recovered by distillation when the aromatic acid or its anhydride is sufficiently volatile; examples are benzoic acid, phthalic anhydride and trimellitic acid anhydride which are sufficiently volatile under commercially feasible distillation conditions. Distillative recovery of such aromatic acid and anhydride products also leaves a residue containing catalyst and contaminant metals and said organic materials.

Efficient catalyst metal utilization and process economics indicate that such residues should be processed for recovery of catalyst metal in a quality acceptable for reuse in the catalytic liquid oxidation process. U.S. Pat. No. 2,964,559 discloses extracting catalyst metals from such residues with water or a lower saturated aliphatic acid (e.g. acetic acid). A preference is given for acetic acid over water as extracting solvent because one-third less extracting solvent is needed even though acetic acid dissolves more of the organic materials than does water in such extraction of the residue. Said patent further discloses that the use of 3–50 volumes of water or acetic acid solvent per volume of residue at temperatures in the range of 120°–300°F. provides extraction of 90–95% of the catalyst metals present and 40–90% of the undesirable attendant metals, especially metals of the iron group and copper.

U.S. Pat. No. 3,341,470 overcomes the drawback of the above water or acetic acid extraction. This is done by incinerating the residues to oxide ash and dissolving the ash with sulfuric acid in the presence of chloride ion which reduces manganese present in the ash as $MnO_2$ to its divalent form. The resulting acidic solvent is treated with a sulfide ($Na_2S$ or $H_2S$) for selective removal of copper as its sulfide precipitate. After copper removal, the remainder of the solution is treated with lime and/or limestone at the boiling point of the solution to a pH of 4.0–4.8 to precipitate iron group metals (e.g. Fe and Cr) for their removal as oxides. The solution, now free of copper and iron group metals, is next treated with sodium carbonate in an amount from 1.0–1.6 times the stoichiometric amount required to precipitate cobalt and manganese as their carbonates. The cobalt and manganese carbonate mixture, according to the patent, has a sufficiently low Cu, Fe and Cr content to be an acceptable source of those catalyst metals for liquid phase oxidation processes.

Such multi-step catalyst metal recovery by incinerating metal catalyst-containing residue, dissolving incinerator ash in sulfuric acid amd selective removal of metals of different groups has several drawbacks. The sulfuric acid consumption and attendant essential chlorine recovery are sufficient drawbacks to make this route economically unattractive. Only incineration of the residues has been practiced and the ash has either been discarded or given or sold (for less than the cobalt and manganese content of the ash) to catalyst suppliers because discard of such ash is ecologically and economically unattractive.

Japanese Patent Application Publication No. 14,339, published Apr. 17, 1971, teaches two routes of selective extractive recovery of cobalt and/or manganese from residue obtained after recovery of terephthalic acid (TA) product and removal of acetic acid solvent from p-xylene oxidation effluent. Such TA residue, which also contains iron from corrosion of oxidation apparatus, is extracted with either water (first route) or aqueous solution (second route) of caustic alkali or caustic alkali carbonate. According to the first route, an aqueous phase is separated from an oily tar-like material, iron as basic ferric acetate is precipitated from the aqueous phase at a pH of 4–5, and the iron-free aqueous phase is treated with alkali carbonate to precipitate cobalt and/or manganese carbonates for recovery of such catalyst metals. In the second route, the aqueous caustic alkali or alkali carbonate treatment produces an insoluble solid precipitate. This solid is recovered, dissolved in inorganic acid, the solution is separated from oily, tar-like material and basic ferric acetic is precipitated from the solution at pH of 4–5, attained by controlled use of an agent containing acetate ion. Cobalt and/or manganese are recovered as carbonates from the iron-free solution by addition thereto of alkali carbonate. Each of such catalytic metal recovery route has the drawback of a separate step of precipitating basic ferric acetate and a step of removing this iron precipitate.

Japanese Patent Application Publication No. 24571, published Oct. 17, 1969, teaches a different approach for catalyst metal recovery from effluent from p-xylene oxidation to TA. Solid TA product is recovered by filtering the oxidation effluent. The filtrate is combined with an aliphatic hydrocarbon boiling above 120°C. and this mixture is distilled to remove acetic acid. The distillation residue containing the hydrocarbon is combined with an aqueous solution of sodium, potassium or ammonium carbonates to precipitate catalyst metal carbonate which is recovered by filtration. This approach for catalyst metal recovery has the drawbacks of introducing the aliphatic hydrocarbon as an additional processing agent and its attendant recovery for reuse.

The present inventive process for recovery of metal and bromine catalyst components from the aforementioned residues of aromatic acid production overcomes the before mentioned drawbacks of the catalyst metal recovery processes described in the foregoing publications. The present inventive process is particularly useful with such residues as are obtained from the production of aromatic carboxylic acids not recovered by distillation of the acid or intramolecular anhydride of the acid but rather are recovered as acids per se from the liquid phase oxidation effluent. Examples of such acids not recovered by distillation of the acid or intramolecular anhydride are iso- and terephthalic acids.

SUMMARY OF INVENTION

The present inventive process for recovery of cobalt and/or manganese and bromine catalysis components from the before-described residue from aromatic acid production, which residue contains said catalysis components, corrosion metals and acidic and neutral organic materials is achieved through the use of water and lithium carbonate and acetic acid. The catalyst metals are recovered as their acetates dissolved in acetic acid and bromine is recovered as lithium bromide dissolved in water. With respect to treatment of such residue containing said catalyst components, water and lithium carbonate are used in two alternative techniques each using different amounts of water and lithium carbonate. By the first technique the residue is leached with water at a temperature from ambient temperature to 100°C. and the aqueous extract solution is separated from insolubles. The aqueous extract contains most, 95–99%, of the catalyst components, is substantially free of corrosion metals and contains less than 50% of the organic components of the treated residue. Lithium carbonate is added to said extract solution in an amount to change the pH of the solution from slightly acidic to pH of 8.0–8.2 at which pH catalyst metals will be substantially quantitatively precipitated as catalyst metal carbonate. After separation, the catalyst metal carbonate precipitate is dissolved in acetic acid. The resulting aqueous alkaline extract solution freed from insoluble catalyst metal carbonate but still containing bromine is incinerated, with or without and preferably with insolubles from water leaching of such residue. The incinerator ash is leached with water to obtain an aqueous solution of lithium bromide. The solid remaining from the leached incinerator ash contains a small amount of corrosion metal oxides and excess $Li_2CO_3$. Said $Li_2CO_3$ combined with corrosion metal oxides can be recycled to provide part of the $Li_2CO_3$ for catalyst metal carbonate precipitation. Although the corrosion metal oxides contaminate the catalyst metal carbonate precipitate, dissolving of said precipitate in acetic acid leaves the corrosion metal oxides as insolubles so their removal by filtration provides a convenient outlet for their removal. The acetic acid solution of cobalt and/or manganese acetates and the aqueous solution of lithium bromide both free of corrosion metals are suitable sources of metal and bromide catalyst components for the aforementioned catalytic liquid phase oxidative preparation of aromatic acids from nuclear alkyl-substituted aromatic hydrocarbons.

By the second technique water and lithium carbonate are used with the residue from aromatic acid production in amounts to dissolve the acidic organic materials as their lithium salts. The amount of lithium carbonate used can be varied from 1 to 2 times the amount indicated by the acid number, mg KOH per gram, of residue. The amount of water used is not critical but for efficient transfer of such salt solution it should have a salt content just below saturation at the lowest temperature encountered in solution transfer or the solution should be maintained during transfer at 5°–10°C. above its temperature of saturation with respect to salt solutes. Formation of such solution can be at a temperature from ambient temperature to 100°C. The formation of said salt solution is accompanied by evolution of $CO_2$ and formation of a precipitate containing catalyst metal carbonates contaminated with corrosion metals and neutral organic materials. The solution of lithium salts is separated from said precipitate. Neutral organics are steam distilled from the metal carbonates. The metal carbonates are recovered and dissolved in an excess amount of (50% aqueous) acetic acid 1.1–1.3 times the stoichiometric amount to convert the carbonates to acetates, and the acetic acid solution is heated to its boiling point to distill off acetic acid and to obtain a pH of 4.5–5.5 at which pH an insoluble form of corrosion metals precipitate. The acetic acid solution is recovered by any convenient means for separating liquids from solids, e.g. decantation, filtration or centrifugation.

The aqueous solution of lithium salts, with or without and preferably with the neutral organics (aromatic acid esters and aldehydes), is incinerated. As in the first technique, the incinerator ash is leached with water to extract lithium bromide. The ash residue, mainly lithium carbonate and some corrosion metal oxides, is recycled to the step of forming the aqueous solution of lithium salts of acidic organic materials and precipitating metal carbonates from residue of aromatic acid production.

For both of the foregoing techniques the acetic acid used for dissolving catalyst metal carbonates should be aqueous acetic acid containing 50–60 weight percent acetic acid (hence 50–40 weight percent water) because such aqueous acetic acid more readily dissolves catalyst metal carbonates at a temperature of 50°–100°C. than does more concentrated acetic acid.

The present inventive process not only provides for recovery of catalyst components but also provides for disposal of organics in residues of aromatic acid production without contributing waste material to environmental pollution. Said benefits are achieved by taking advantage of the unique water solubility characteristics of lithium bromide and lithium carbonate. Lithium bromide is very soluble in water and its water solubility increases with increasing temperature. Lithium carbonate, however, is quite insoluble in water and its water solubility decreases with increasing temperature. Such water insolubility of lithium carbonate does not present problems either with respect to its use for metal carbonate precipitation because chemical reaction is here involved or its substantially complete recovery from incinerator ash for recycle to said carbonate precipitation.

To prevent formation of acetic acid insoluble $MnO_2$ during the above treatment of residue from aromatic acid production with both water and lithium carbonate (second technique), the amount of lithium carbonate used is preferably limited in amount from the stoichiometric amount of $Li_2CO_3$ calculated from residue acid number to the amount providing an aqueous solution having a pH not exceeding 8.2 because such amount of lithium carbonate will not cause alkaline conditions favoring formation of $MnO_2$ (pH above about 8.2) but larger amounts of $Li_2CO_3$ can be used when said treating step is carried out in a closed system wherein oxygen-containing atmosphere is replaced by an inert gas such as $CO_2$, $N_2$ or steam to eliminate oxygen for $MnO_2$ formation. When such residue does not contain manganese, such pH limitation or exclusion of oxygen is, of course, unnecessary.

The first technique for use of water and $Li_2CO_3$ for treatment of residue of aromatic acid production and catalyst metal carbonate production is preferred because the leaching with water is selective with respect to extraction of catalyst metals, there is not required a separate step of precipitating corrosion metals from acetic acid solution of catalyst metal acetates, there is no likelihood of $MnO_2$ formation, and the catalyst metal carbonates are not contaminated with neutral organic materials. In this first technique the amount of water used can be between 1 and 10 weight parts per weight part of residue to be leached. At the lower ratio of water, i.e. 1–3:1.0 weight parts, for leaching, it is preferred to use an additional 2–3 weight parts of water to wash the insolubles (total of 3–6:1.0 water:residue ratio) and combine the water wash with the extract solution. This combined wash and extract liquors will contain 97–99% of the catalyst metals originally in the residue, as would the use of 7–10:1.0 water to residue ratios but with handling of lower volumes of liquid.

The present inventive method for recovery of catalyst metals and bromine catalysis components of residue from aromatic acid production is especially suited for application to residues from the production of terephthalic acid (TA) from p-xylene, isophthalic acid (IA) from m-xylene and from TA and IA production from mixtures of p- and m-xylene isomers by the aforementioned oxidations conducted in the presence of acetic acid as solvent and in the presence of sources of bromine and manganese and/or cobalt as metal catalysts. Said TA, IA or mixtures of TA and IA are separated as solid products per se from the oxidation effluents and then substantially all the acetic acid is removed by distillation or evaporation leaving the TA residue, IA residue or TA-IA residue containing catalyst metal and bromine components of catalysis, corrosion metals (mainly iron) and organic (acidic and neutral aromatic materials. Such residues can contain from 1.5–50 percent bromine, 0.5–40% cobalt and 0–20% manganese. For example, such residues from commercial operation of the method of U.S. Pat. No. 2,833,816 can contain 1.5–10% bromine, 0.5–6.0% cobalt and 0–12% manganese and from the method of U.S. Pat. No. 3,139,452 and modifications thereof can contain 30–50% bromine, 25–50% cobalt and 0–25% manganese on a weight basis.

The following examples illustrate the present inventive recovery of catalyst metal and bromine components from residues of aromatic acid production and provide a more explicit disclosure of said recovery. Such examples will also provide the basis for those skilled in the art of aromatic acid production to apply the use of water, lithium carbonate and acetic acid to other residues from similar aromatic acid production.

EXAMPLE 1

The residue here employed is from terephthalic acid (TA) production from p-xylene oxidation with air in the presence of acetic acid as solvent and in the presence of catalysis provided by a combination of cobalt and manganese as metal components and bromine. Such TA residue contains 4.56% bromine, 1.51% cobalt and 2.96% manganese from the catalyst, 0.05% iron from apparatus corrosion and 90.92% aromatic organic materials and has an acid number of 445 mg KOH per gram of residue. To 6212 pounds of water at 100°C. there are added 1500 pounds of said TA residue and 440 pounds of lithium carbonate. The resulting mixture is stirred and maintained at 100°C. for 1 hour during which time the residue dissolves and a precipitate containing carbonates of cobalt, manganese and iron forms. Said precipitate is recovered by filtration and the aqueous filtrate is reserved. The precipitate is treated at 120°C. with 120° steam to remove neutral aromatic organic compounds not dissolved from said TA residue. The steam and vapors are condensed and the water-organic condensation mixture is combined with the reserved filtrate. The carbonate precipitate remaining after steam treatment is combined with 291 pounds (20% excess) of aqueous acetic acid containing 60% acetic acid and 40% water by weight. The resulting solution is heated to 80°C. to dissolve the metals carbonates. After evolution of $CO_2$ ceases, the resulting solution is heated to distill off acetic acid to a solution pH of 5.4. A precipitate containing corrosion metals forms. The resulting mixture is cooled to and filtered at 90°F. The filtrate, upon analysis for metals, is found to be substantially iron free and contains only the cobalt and manganese amounting to 95–97% of those metals in the starting TA residue.

The reserved mixture of aqueous filtrate from TA residue treatment and condensate from steam treatment of metal carbonates is incinerated at 900°C. and the incinerator ash is collected. The ash at ambient temperature is leached and washed with a total of 500 pounds of water at 100°C., and the aqueous extract solution and wash are combined and recovered. The combined extract and wash contain liquors containing 74.7 pounds LiBr and a small amount, 0.6% $Li_2CO_3$. The residue of the ash, 404.4 pounds (dry basis) is substantially 100% $Li_2CO_3$ which with makeup lithium carbonate equivalent to the lithium content of LiBr recovered is added to the TA residue treating step in the next cycle.

EXAMPLE 2

The TA residue used in Example 1 is used in this recovery method. Said TA residue is ground to pass through 25 mesh Tyler Standard Screen. The 1500 pounds of ground TA residue (68.4 pounds bromine, 22.65 pounds cobalt, 44.4 pounds manganese, 0.735 pounds iron and remainder is aromatic acidic and neutral materials) is slurried with 2000 pounds of water at 80°C. for 60 minutes. The resulting slurry is centrifuged, the centrifuge cake washed with 2000 pounds of water at 30°C. and the wash is combined with the filtrate. The washed centrifuge cake is reserved.

To the combined aqueous wash and filtrate there is added $Li_2CO_3$ to a pH of 8.1, about 420 pounds $Li_2CO_3$, to precipitate catalyst metal carbonate and the slurry is stirred for 20 minutes. The precipitate, a mixture of cobalt and manganese carbonates, is recovered by filtration and the filtrate is reserved. The carbonate precipitate is dissolved in 233 pounds of 60% acetic acid at 80°C. This solution, upon analysis, is found to be substantially free of iron and contains 97–98% of cobalt and manganese present in the original TA residue.

The reserved filtrate and reserved insolubles from leaching of TA residue are combined and the mixture is incinerated at 900°C. The incinerator ash, 74.4 pounds LiBr and 390 pounds $Li_2CO_3$, is collected, leached and washed with a total of 500 pounds of water. The combined extract and wash liquors contain 12.9% LiBr and 0.6% $Li_2CO_3$. The ash residue contains 386.6 pounds $Li_2CO_3$ and a small amount, 1.06 pounds, of iron oxide.

The method of Example 2 compared to the method of Example 1 uses less total water.

The above processes applied to IA residue or IA-TA residues will give substantially the same result.

What is claimed is:

1. In the production of iso- or terephthalic acid by the liquid phase oxidation of m- or p-xylene with molecular oxygen in the presence of acetic acid solution of components of catalysis comprising manganese and/or cobalt and a source of bromine, wherein such phthalic acid product is first separated as a solid and then acetic acid is removed from the fluid oxidation effluent leaving a residue containing said components of catalysis, at least iron as contaminant metal, and acidic and neutral organic compounds; the recovery of said components of catalysis from said residue for recycle to said oxidation by the treatment of said residue with water and lithium carbonate by the method comprising:
   a. leaching such residue with water at a temperature from ambient temperature to 100°C with an amount of water in the range of from 1 to 10 weight parts per weight part of residue,
   b. separating the aqueous extract from insolubles,
   c. adjusting the pH of said aqueous extract to pH in the range of 8.0–8.2 by the addition of lithium carbonate whereat said pH range iron-free catalyst metal carbonate precipitates,
   d. separating the catalyst metal carbonate precipitate from the aqueous mother liquor,
   e. dissolving at a temperature of 50°–100°C the separated catalyst metal carbonate in aqueous acetic acid of 50–60 weight percent acetic acid content in an amount thereof from 1–1.3 times the stoichiometric requirement for conversion of catalyst metal carbonate to catalyst metal acetate and recycling said catalyst metal acetate to said oxidation process,
   f. incinerating said aqueous mother liquor to ash containing LiBr and oxides of contaminant metal,
   g. leaching said ash at a temperature from ambient temperature to 100°C with an amount of water to dissolve the lithium bromide content of said ash, and
   h. separating from said metal oxides the aqueous solution of lithium bromide and recycling the aqueous solution to the oxidation process.

2. In the production of iso- or terephthalic acid by the liquid phase oxidation of m- or p-xylene with molecular oxygen in the presence of acetic acid solution of components of catalysis comprising manganese and/or cobalt and a source of bromine, wherein such phthalic acid product is first separated as a solid and then acetic acid is removed from the fluid oxidation effluent leaving a residue containing said components of catalysis, at least iron as contaminant metal, and acidic and neutral organic compounds; the recovery of said components of catalysis from said residue for recycle to said oxidation by the treatment of said residue with water and lithium carbonate by the method comprising:
   a. leaching said residue with water at ambient temperature to 100°C in the presence of an amount of lithium carbonate from 1 to 2 times the amount indicated by the acid number in mg KOH per gram of the residue to convert to lithium salts the acidic organic materials in said residue and with an amount of water to dissolve such lithium salts,
   b. separating such aqueous solution from insolubles consisting essentially of catalyst metal carbonate, iron carbonate and the neutral organic materials content of the residue,
   c. removing and collecting said neutral organic materials from said insolubles by steam distillation thereof,
   d. dissolving said neutrals-free insolubles at a temperature from 50°–100°C in aqueous acetic acid containing 50–60 weight percent acetic acid in an amount thereof from 1.0–1.3 times the stoichiometric amount required to convert the metal carbonates to dissolved metal acetates,
   e. heating said solution of metal acetates to remove acetic acid and obtain a solution pH of 4.5 to 5.5 whereat an insoluble form of iron precipitates,
   f. separating said pH 4.5 to 5.5 solution from said precipitate and recycling said separated solution to the oxidation process,
   g. incinerating to a lithium bromide-containing ash a mixture of said aqueous solution of lithium salts and said removed and collected neutral organic materials,
   h. leaching said ash at ambient temperature to 100°C with water in an amount to dissolve the lithium bromide content of said ash, and
   i. separating from the undissolved portion of said ash the aqueous solution of lithium bromide and recycling the separated solution to the oxidation process.

3. The method of claim 1 wherein the undissolved portion of the leached ash is used in leaching step (a) to provide at least a portion of the lithium carbonate requirement.

* * * * *